US005868401A

United States Patent [19]

Darcy, III

[11] Patent Number: 5,868,401

[45] Date of Patent: Feb. 9, 1999

[54] COMPLIANT FLANGE HOLDING APPARATUS

[75] Inventor: John J. Darcy, III, Webster, N.Y.

[73] Assignee: Xerox Coporation, Stamford, Conn.

[21] Appl. No.: 7,256

[22] Filed: Jan. 14, 1998

[51] Int. Cl.[6] .................................................... B23B 31/00

[52] U.S. Cl. .................................. 279/3; 269/3; 279/133

[58] Field of Search .................................. 269/21; 279/3, 279/133

[56] References Cited

U.S. PATENT DOCUMENTS

| | | | |
|---|---|---|---|
| 5,282,888 | 2/1994 | Fukawa et al. | 118/500 |
| 5,322,300 | 6/1994 | Mistrater et al. | 279/2.17 |
| 5,452,905 | 9/1995 | Bohmer et al. | 279/3 |
| 5,456,146 | 10/1995 | Hubbard et al. | 279/133 |
| 5,673,922 | 10/1997 | Sherstinsky et al. | 279/133 |
| 5,738,165 | 4/1998 | Imai | 279/3 |
| 5,772,170 | 6/1998 | Tsukushi | 269/21 |

*Primary Examiner*—Daniel W. Howell
*Assistant Examiner*—Rouzbeh Tabaddor
*Attorney, Agent, or Firm*—Zosan S. Soong

[57] ABSTRACT

A flange holding apparatus composed of: (a) a head for engaging a flange; (b) a collar surrounding the head, wherein the collar extends along a portion of the length of the head, wherein the head and the collar define a gap therebetween and the head can move between a centered position and an eccentric position relative to the collar; and (c) a resilient member disposed in the gap, wherein movement of the head from the centered position to the eccentric position compresses a portion of the resilient member, whereby the compressed portion of the resilient member urges the head to return to the centered position.

8 Claims, 2 Drawing Sheets

COMPLIANT FLANGE HOLDING APPARATUS

FIELD OF THE INVENTION

This invention relates to a flange holding apparatus having a compliant head used to insert a flange into the end of a substrate.

BACKGROUND OF THE INVENTION

To use a cylindrical, hollow substrate in certain machinery, a flange is inserted into each end of the substrate. Rotational drive mechanisms then can be coupled to the flanges to rotate the substrate. The substrate can be for example a photoreceptor incorporated into an electrostatographic printing machine. A problem is that the flanges may be improperly inserted into the substrate if, for example, there are tolerance fluctuations in the substrate inner diameter, substrate position relative to the flange, and in the flange. The flanges may not become completely seated up against the substrate if they are for instance tilted during the insertion process. Thus, there is a need which the present invention addresses for a compliant flange holding apparatus.

The following documents disclose conventional chuck assemblies: Fukawa et al., U.S. Pat. No. 5,282,888 and Mistrater et al., U.S. Pat. No. 5,322,300.

SUMMARY OF THE INVENTION

The present invention is accomplished in embodiments by providing a flange holding apparatus comprising:

(a) a head for engaging a flange;

(b) a collar surrounding the head, wherein the collar extends along a portion of the length of the head, wherein the head and the collar define a gap therebetween and the head can move between a centered position and an eccentric position relative to the collar; and (c) a resilient member disposed in the gap, wherein movement of the head from the centered position to the eccentric position compresses a portion of the resilient member, whereby the compressed portion of the resilient member urges the head to return to the centered position.

BRIEF DESCRIPTION OF THE DRAWINGS

Other aspects of the present invention will become apparent as the following description proceeds and upon reference to the Figures which represent preferred embodiments.

Unless otherwise noted, the same reference numeral in different Figures refers to the same or similar feature.

DETAILED DESCRIPTION

Figure 1:
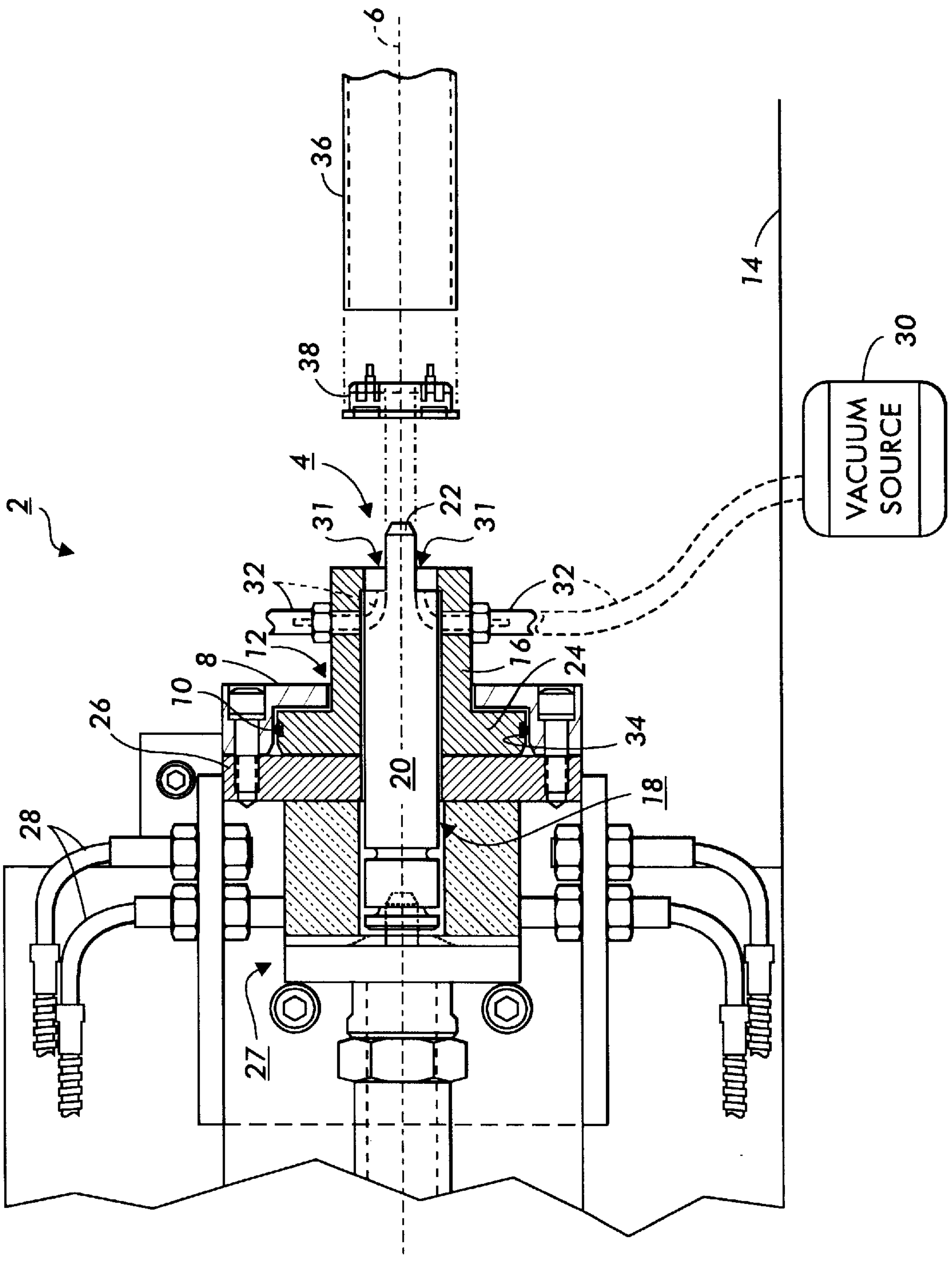
FIG. 1 is a simplified, cross-sectional elevational view of the flange holding apparatus (a flange and a substrate are in exploded view)

In FIG. 1, the flange holding apparatus 2 is composed of a head 4 defining a longitudinal axis 6, a collar 8, and a resilient member 10 disposed in the gap 12 between the head 4 and the collar 8. The flange holding apparatus 2 is positioned over a flat surface 14 which could be for example a table and the head defines a longitudinal axis 6 which is generally parallel with the flat surface 14. In FIG. 1, the head 4 is composed of a shell 16 and a detachable flange engaging member 18 having a shaft section 20 coupled to a pin section 22 with a smaller width than the shaft section. The shell 16 as depicted in FIG. 1 has a flared base region 24. However, in other embodiments, the shell may be entirely cylindrical in shape, i.e., with no flare in the base region. The flange engaging member 18 is detachable from the shell 16 and is in fact detachable from the entire flange holding apparatus 2 to allow insertion of other flange engaging members having pin sections of different sizes. The flange engaging member 18 is made detachable from the shell 16 and in fact from the rest of the flange holding apparatus 2 by using for example a removable pull pin (not shown). The pull pin is disposed in a hole (the hole orientation is perpendicular to the longitudinal axis 6) made through the shell 16 and the shaft section 20 to temporarily lock the flange engaging member in position within the shell 16.

The collar 8 surrounds the shell 16 at the base region 24. As seen in FIG. 1, the cross-sectional shape of the collar has a L-shape to accommodate the flared base region of the shell. The collar is coupled to the base member 26. If the base region of the shell is not flared, then the collar may be entirely cylindrically shaped, with no L-shape.

The gap between the collar and the shell depends on a number of factors including for example the degree of compliance desired. The gap may range in thickness of from about 0.5 mm to about 5 mm. The preferred amount of compliance for the head is about 0.008 inch radially from the longitudinal axis 6 (also referred herein as a centerline); this corresponds to a gap dimension of about 0.020 inch around the head. As is apparent, the collar supports the head where the head can move within the collar; contact by the head with the collar will define the extent of head movement.

The shell 16, the collar 8, and the base member 26 may define a hole to allow the flange engaging member to extend to a region 27 of the flange holding apparatus where there are disposed fiber optical cables 28 coupled to a sensor (not shown) for detecting the type of detachable flange engaging member present (different flange engaging members may be indicated with distinctive markings, e.g., number of grooves).

Preferably, the head 4 defines one or more openings 31 adjacent the pin section 22 which are in communication with a vacuum source 30 via passageways 32. The preferred range of vacuum suction force is from about 8 to about 10 inches of water.

The shell 16 preferably defines a groove 34 where the resilient member 10 is partially disposed in the groove. The resilient member encircles the head and can contact both the shell and the collar. As depicted in FIG. 1, the resilient member 10 is an O-ring. A standard durometer O-ring such as a 42 durometer O-ring may be used. The O-ring may be a nitrile based composition. Other suitable materials for the resilient member include for example open cell foam and one or more springs. Where springs are employed, the springs may be arranged radially around the head where the spring type can be any suitable compression spring or wave washer. Counterbore holes can be drilled into the head and collar to capture the springs. Alternatively, an adhesive also can be used to capture the resilient member.

Figure 2:
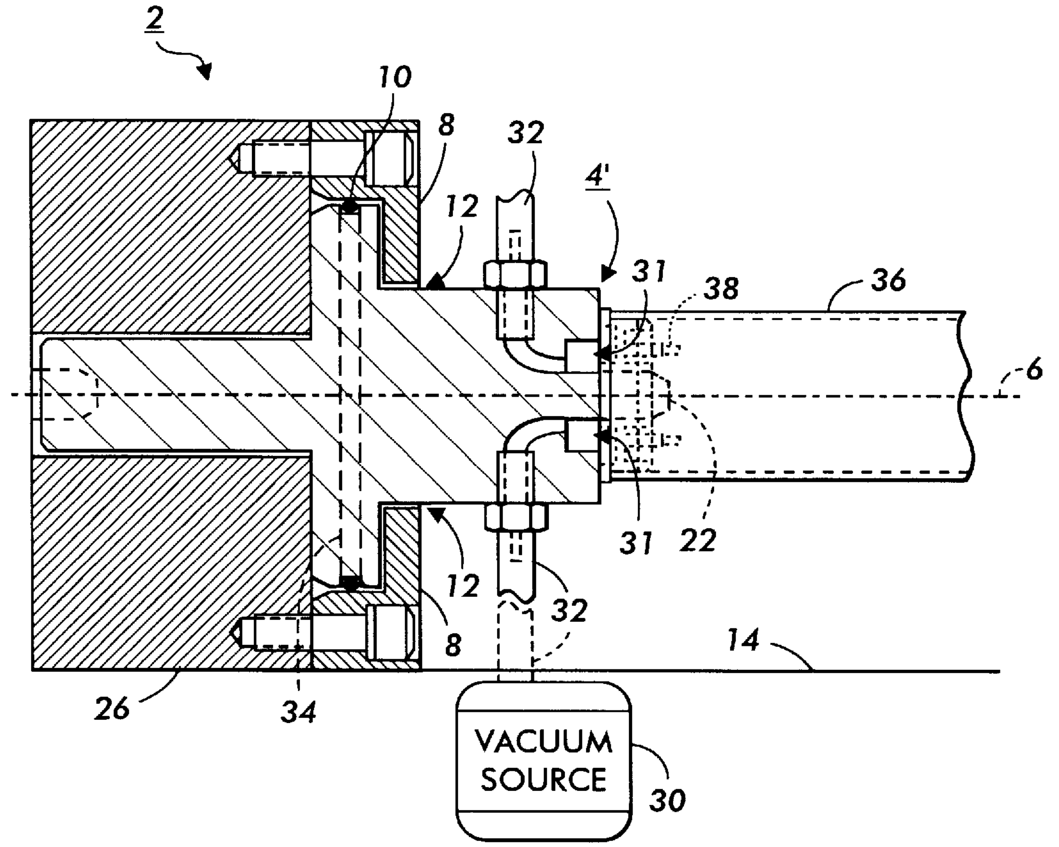
FIG. 2 is a simplified, cross-sectional elevational view of another embodiment of the flange holding apparatus pressing a flange onto a substrate.

In FIG. 2, the flange holding apparatus 2 is modified so that the head 4' is a single piece; thus, the flange engaging member is nondetachable from the shell. The pin section 22 of head 4' is present. In addition, the fiber optical cables 28 of FIG. 1 coupled to a sensor are no longer present since the flange engaging member is nondetachable from the shell and there is thus no need to determine the type of flange engaging member employed.

Operation of the flange holding apparatus 2 depicted in FIGS. 1 and 2 is now described. The flange 38 defining a central opening is positioned on the pin section 22. The vacuum source 30 is activated to generate a suction force on the flange to help ensure that the flange remains in the right orientation on or against the head (4, 4') during the mounting of the flange onto the substrate 36. The flange holding apparatus 2 holding the flange 38 is moved against the end of substrate 36 while the substrate is held stationary to press the flange onto the end of substrate 36. The substrate is generally a hollow cylinder open at both ends and may be held by a cradle device (not shown). The substrate preferably is a photoreceptor having layered photosensitive material. During the mounting of the flange onto the substrate, the longitudinal axis 6 of the substrate 36 is generally parallel with the flat surface 14. The head (4, 4') holding the flange is compliant and can shift position during the flange mounting process by the contact force transmitted by the flange to the head during contact between the flange and the substrate end. The head can shift position between a centered position (depicted in FIGS. 1 and 2) and one or more eccentric positions to compensate for tolerance fluctuations in the substrate inner diameter, substrate position relative to the flange, and in the flange. The phrase centered position means in embodiments that the head is concentric with the collar where both components are on the same centerline. The phrase eccentric position means in embodiments that the head is on a different centerline than the collar.

Other modifications of the present invention may occur to those skilled in the art based upon a reading of the present disclosure and these modifications are intended to be included within the scope of the present invention.

I claim:

1. A flange holding apparatus comprising:

(a) a head for engaging a flange;

(b) a collar surrounding the head, wherein the collar extends along a portion of the length of the head, wherein the head and the collar define a gap therebetween and the head can move between a centered position and an eccentric position relative to the collar; and (c) a resilient member disposed in the gap, wherein movement of the head from the centered position to the eccentric position compresses a portion of the resilient member, whereby the compressed portion of the resilient member urges the head to return to the centered position.

2. The apparatus of claim 1, wherein the head comprises a shell and a flange engaging member that is detachable from the shell.

3. The apparatus of claim 1, wherein the head is a single piece.

4. The apparatus of claim 1, wherein the resilient member is an O-ring.

5. The apparatus of claim 4, wherein the O-ring encircles the head.

6. The apparatus of claim 4, wherein the head defines a groove and the O-ring is partially disposed in the groove.

7. The apparatus of claim 1, further comprising a vacuum source coupled to the head to enhance engagement of the flange with the head.

8. The apparatus of claim 1, wherein the head is positioned over a flat surface and the head defines a longitudinal axis which is generally parallel with the flat surface.

* * * * *